Jan. 3, 1961 W. G. SPENCE 2,966,925
CHECK VALVES
Filed April 21, 1958
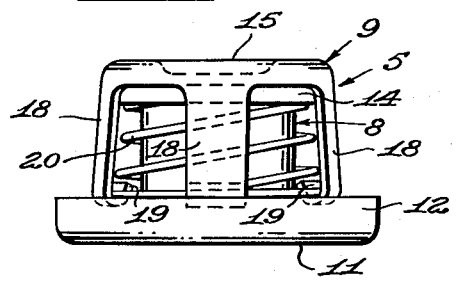
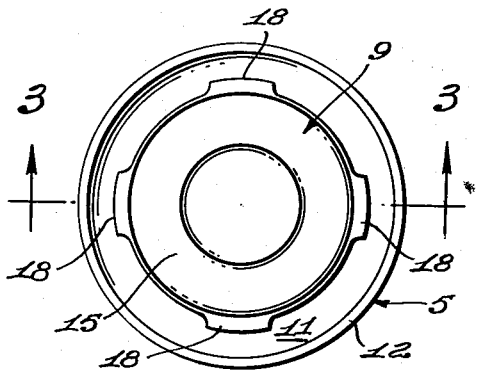
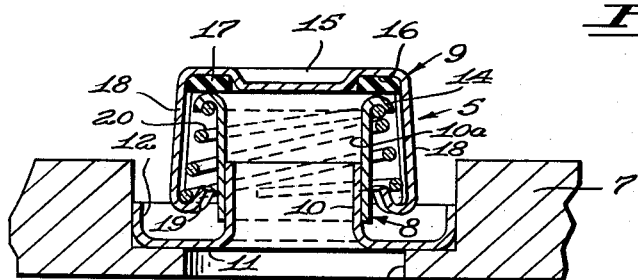
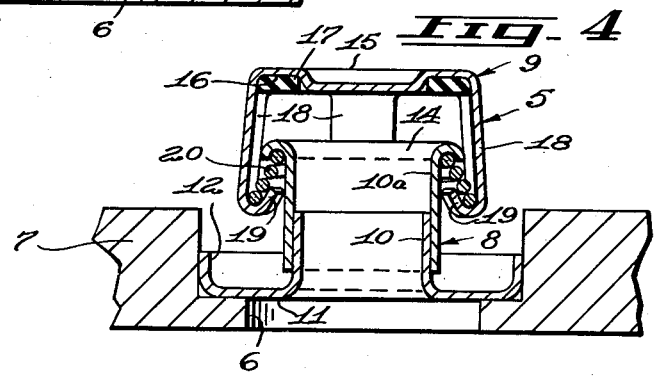
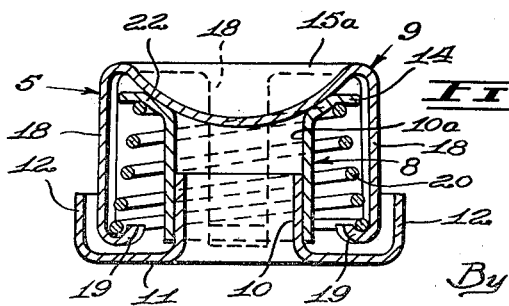
Inventor
W. G. SPENCE
By Fetherstonhaugh & Co.
Attorneys

United States Patent Office 2,966,925
Patented Jan. 3, 1961

2,966,925

CHECK VALVES

William G. Spence, 5080 Pie IX Blvd., Montreal, Quebec, Canada

Filed Apr. 21, 1958, Ser. No. 729,589

5 Claims. (Cl. 137—540)

This invention relates to improvements in check valves either for discharge or inlet of fluids for pumps or other equipment.

A particular object of this invention is to provide a valve assembly comprising a tubular seat member open at both ends and provided at one end with an outwardly directed valve engaging portion, a movable valve member normally seated against said valve engaging portion and provided with arms adapted to lie outwardly of said tubular seat member and a compression spring arranged about the tubular portion of the seat member so as to be confined between the outwardly directed valve engageing portion of the seat member and marginal portions at the free ends of the arms of said movable valve member so as to resiliently retain the valve member in seating engagement with said valve seat member.

A particular feature of this invention consists in the provision of a valve assembly which, when inserted through an opening in a pump or other container, will provide a maximum discharge or inlet passage with a minimum diameter tubular passage.

Another feature consists in the provision of a valve assembly of the character described in which no obstruction exists in the tubular passage which would either reduce the capacity of the passage or necessitate enlargement of the tubular passage to compensate for any central retaining member which would otherwise reduce the tubular passage.

Another object is to provide a valve assembly of simplified construction in which the valve seat member and the movable valve member may be inexpensively manufactured from thin sheet metal or like materials by stamping or similar processes.

The above and other objects and features characteristic of this invention will be understood more readily from the following detailed description taken in connection with the accompanying drawings, in which—

Fig. 1 is a side elevational view of a valve assembly embodying my invention.

Fig. 2 is a top plan view of the assembly shown in Fig. 1.

Fig. 3 is a sectional view taken along the line 3—3 of Fig. 2.

Fig. 4 is a view similar to Fig. 3 but showing the assembly parts in an open-valve position.

Fig. 5 is a sectional view showing a modification of my valve assembly.

Referring more particularly to Figs. 1 to 4 of the drawings, 5 generally designates a valve assembly adapted to function as an outlet or discharge valve when mounted over a discharge opening 6 in the wall 7 of a chamber or like enclosure.

The valve assembly comprises a valve seat member 8 and a movable valve element 9. The seat member 8 is formed from a sheet of metal, plastic or like material which is stamped to form a tubular element 10 open at both ends. One end of the tubular element 10 is integrally joined to an outwardly directed circular base 11 having its outer marginal portion flanged as indicated at 12. The other end of the tubular element 10 is provided with an outwardly and downwardly turned lip which also serves as a seat 14 for the valve element 9. The lip or seat portion 14 may be integrally formed on the outer end of the tubular element 10 or the tubular element 10 may be formed in two parts as shown in Figs. 3 and 4 including a sleeve member 10a fitted about the tubular element 10 proper and provided at its outer end with the lip or valve seat 14. This arrangement permits adjustment of the sleeve axially to allow for variations in the thickness of the wall through which the valve is mounted. In addition, it also enables the tubular member to be conveniently produced by a stamping process from thin sheet metal and the like.

The valve element 9 comprises a disc 15 having an annular marginal recess 16 opening toward the valve engaging portion of the valve seat member 8. A compressible washer or sealing member 17 is fitted in recess 16 and is adapted to engage the lip or valve seating portion 14 of seat member 8 when the valve is in its closed position. The valve closure disc 15 is also provided with four arms 18 which extend along the outer side of valve seat member 8 toward the end of the seat member remote from lip or seat portion 14. The lower ends of arms 18 are bent inwardly as indicated at 19. A coil spring 20 is disposed to encircle the valve seat member 8 and has its opposite end confined in compression between the outwardly directed valve engaging lip or seating portion 14 and the inwardly directed marginal portions 19 provided at the free ends of arms 18.

In operation, fluid being discharged through the tubular element 10 forces the valve element 9 outwardly from its seating engagement with the lip 14. The liquid pours over the lip 14 through the spaces defined between the adjacent arms 18. This arrangement allows the maximum amount of liquid to be discharged through the tubular element 10 since there is no central obstruction with the element 10 which would impede or reduce the outward flow of the liquid.

In Fig. 5 I have shown a modified valve assembly in which the lip 14 has a tapered intermediate section 22 to provide a seat of substantial dimension. The movable valve element 9 consists of a disc 15a presenting a concavo-convex configuration designed to be directly seated on the tapered seat 22 of the valve seat member 8.

This arrangement is desirable when the liquid is a corrosive which would be detrimental to a plastic washer. The arrangement also enables the valve to be seated even during a tilting of the valve element 9 relative to the seat 8, since the curved surface of the disc 15a is contoured to engage the seating portion 22 throughout the entire curved surface of said disc 15a.

Another feature of the valve element 9, as shown in Fig. 5, is that there is no downward turn of the outer margin of the disc 15a between the arms 18. Thus, any solid matter in the liquid will be free to pass outwardly through the valve without being impeded by any depending lip.

In the present instance, the drawing illustrates the valve to function as an outlet or discharge valve. However, it will be understood that by inverting the valve assembly so that the valve opens inwardly instead of outwardly, it may be employed without change as an inlet valve.

The circular base 11 of the tubular element 10 need not have its marginal portion flanged. This latter arrangement would be preferred if it was desirable to position the marginal portion of the base flatly against a surface at right angles to the axis of the tubular portion of element 10.

What I claim is:

1. A check valve assembly comprising a tubular valve seat member open at both ends and provided at one end with an outwardly directed valve engaging portion, a valve member normally seated against said outwardly directed valve engaging portion and provided with arms extending along the outer side of the valve seat member toward the end of the valve seat member remote from the valve engaging portion, said arms terminating at their free ends in inwardly directed portions opposed to said outwardly directed valve engaging portion, and a valve seating spring encircling the valve seat member and confined in compression between the outwardly directed valve engaging portion of the valve seat member and the inwardly directed portions provided at the free ends of said arms, said valve member being in the form of a disc having an annular marginal recess opening toward the valve engaging portion of the seat member and a compressible sealing member fitted in said recess and adapted to engage the valve seating portion of the valve seat member in the closed position of the valve member.

2. A check valve assembly as set forth in claim 1, in which the valve member is in the form of a valve disc presenting a concavo-convex valve seat engaging portion designed so that the convex surface thereof seats against the valve engaging portion of the valve seat in the closed position of the valve.

3. A check valve assembly as set forth in claim 1, in which the end of the valve seat member remote from the valve engaging portion thereof is provided with an outwardly directed attaching base, said attaching base including a portion extending radially outwardly from the valve seat member and a marginal flange extending substantially at right angles to the radially extending portion of said base.

4. A check valve assembly comprising a tubular member provided, at one end, with an outwardly directed continuous annular flange constituting a valve seat, a valve member normally disposed against said seat and provided with integral arms extending along the outer surface of the tubular member in spaced relation thereto and having their free ends curved inwardly to provide hook-shaped portions opposed to said valve seat and a coil spring encircling the tubular member with one end of the spring bearing against the surface of the valve seat remote from the valve-engaging surface thereof and the other end bearing against the hook-shaped ends of said arms, said spring being confined in compression between the valve seat and the hook-shaped ends of said arms and serving to normally hold the valve member in contact with said valve seat.

5. A check valve assembly as set forth in claim 4, in which the valve seat is transversely curved to provide a convexly curved valve-engaging surface and a concavely curved spring-engaging surface.

References Cited in the file of this patent
UNITED STATES PATENTS

| | | |
|---|---|---|
| 323,794 | Davis | Aug. 4, 1885 |
| 607,548 | Pinkert | July 19, 1898 |
| 812,885 | Sanborn | Feb. 20, 1906 |
| 1,044,300 | Tryon | Nov. 12, 1912 |
| 2,367,055 | Rike | Jan. 9, 1945 |
| 2,430,427 | Katcher | Nov. 4, 1947 |
| 2,527,381 | St. Clair | Oct. 24, 1950 |